Aug. 1, 1950
R. A. LOUX
2,517,221
SECONDARY AND SERVICE RACK INSULATOR
Filed May 27, 1948
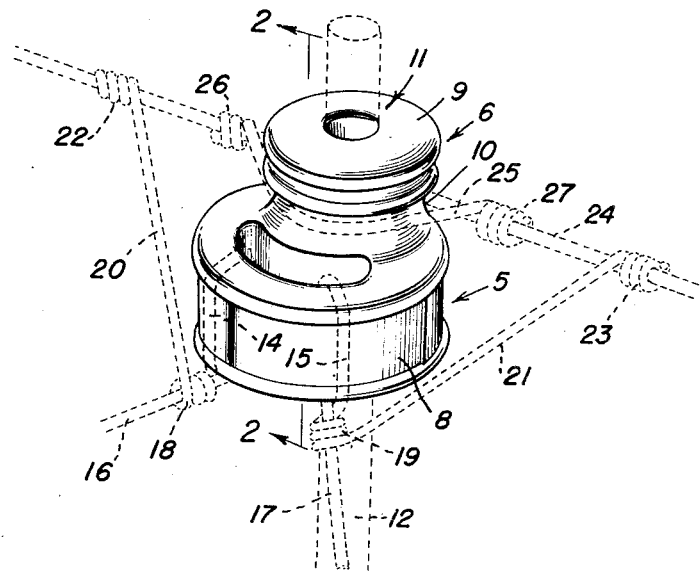
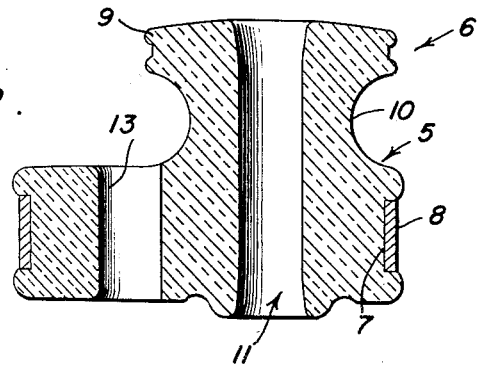
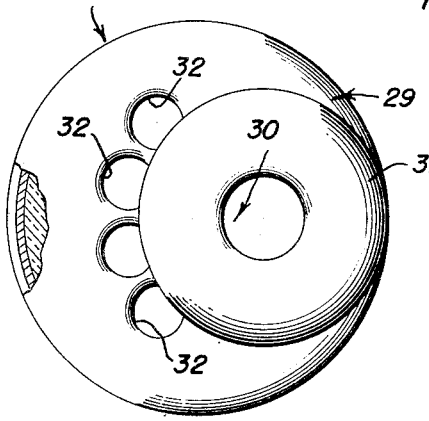
Raymond A. Loux
*INVENTOR.*
BY *Clarence A. O'Brien
and Harvey B. Jacobson*
Attorneys Patented Aug. 1, 1950

2,517,221

UNITED STATES PATENT OFFICE 2,517,221

SECONDARY AND SERVICE RACK INSULATOR

Raymond A. Loux, Nashwauk, Minn.

Application May 27, 1948, Serial No. 29,570

3 Claims. (Cl. 174—43)

The present invention relates to certain new and useful improvements in secondary and service rack insulators characterized by unique structural and functional features expressly adapted to fulfill the needs and requirements of electrical men in the field.

It is a matter of common knowledge to those skilled in the art to which the invention relates that input service lines or wires are connected to spool-type insulators, generally several or more, which are supported on a vertical rod forming part of a secondary rack, the latter being mounted, in usual fashion, on the main power lines pole. Secondary conductors are directly associated with the insulators and the adjacent ends of the service lines are connected to the insulators and electrically connected with the secondary conductors.

There has been a long felt need for an up-to-date and simplified secondary service rack insulator. It follows, therefore, that the present invention has to do with a new styled and especially constructed insulator having facilities and simplicity of design and adaptability that it constitutes an efficient and valuable contribution to the trade.

Another object of the invention is to provide a novel and practical insulator which is strong, reliable, possessed of great simplicity in form, is economical to use, promotes the saving of time and labor, appreciably simplifies electrical wiring and reduces, it is believed, the possibility of radio interference between closely related current conductors.

With the use of this improved insulator, the service wires and secondary wire can each be removed separately without interference from the other, making it invaluable where rewiring or changes in services have to be made. Its use also eliminates the wire entanglements by the services and the secondary which now occur with the use of regular insulators. Another advantage is the equalization of the wire tension on the service wires when separated, as provided for by the admission of multiple holes where the service wires enter the insulator.

In reducing to practice a preferred embodiment of the invention, I provide a body of insulation which is characterized by a circular base having aperture means to accommodate a plurality of power take-off service wires, said base being provided, on its top with an upstanding spool-shaped knob and said knob constituting a novel adapter whereby the insulator may be conveniently and effectively located and attached, by a simple tie wire with an adjacent power line referred to in the trade as a secondary conductor.

Other objects, features and advantages of the invention will become more readily apparent from the following description and the accompanying illustrative drawings.

In the drawings, wherein like numerals are employed to designate like parts throughout the views:

Figure 1 is a perspective view of an insulator constructed in accordance with the principles of the present invention showing, in phantom lines, the manner in which same is mounted on a secondary rack rod and how the wires are associated and connected with the insulator;

Figure 2 is a central vertical section taken approximately on the plane of the line 2—2 of Figure 1, looking in the direction of the arrows; and Figure 3 is a top plan view of a modified form of the invention.

Referring now to the drawings by reference numerals and accompanying lead lines, it will be seen, as before indicated, that the insulator comprises a single solid body of insulation material, porcelain, for example. Said body is characterized by two main parts, one of which is denoted as a base 5 and the other as an adapter and attaching knob 6. The base is circular in general form and the outer peripheral edge is provided with an endless channel 7 in which a reinforcing band of metal 8 is snugly seated. The knob 6 is eccentrically offset in respect to the vertical central axis of the base and comprises a suitable retaining head 9 and an annular groove 10 defining a hub. A vertical bore 11 is formed centrally through the knob and eccentrically through the base and functions to permit the insulator to be mounted on the vertical rod 12 forming a part of the customary secondary pole attached rack (not shown). Aperture means is provided in the offset segmental portion of the base, said means being generally denoted in Figure 1 by the numeral 13. Specifically, 13 denotes a segmental slot which is eccentric to the vertical axis of the base and which is thus located to one side of the knob where it is accessible to accommodate the looped portions 14 and 15 of the service wires 16 and 17. The wires are looped and wrapped as at 18 and 19 and the end portions 20 and 21 are, in turn, wrapped as at 22 and 23 around the secondary conductor 24. The latter is seated partly on one side of the knob and is fastened securely in the groove by a tire wire 25 whose ends 26 and 27 are wrapped around the conductor 24 in the manner shown.

Reverting to the reinforcing iron band 8, this protects the insulator and in case the insulator is accidentally broken, the service wires cannot drop to the ground as the iron band will encircle the rod 12, thus protecting all traffic and property that the service wires might accidentally cross.

In the modification shown in Figure 3, the same fundamental characteristics are embodied. That is to say, the insulator comprises a base 28 and an integral offset or eccentrically positioned knob 29, there being a bore 30 extending through the base and knob in the same manner as shown in Figure 2. The head of the knob is denoted by the numeral 31. The marginal portion of the base is the same as shown in Figure 2 but is not here detailed. The principal distinction here is that the aforementioned "aperture means" instead of being a segmental or arcuate slot comprises a plurality of individual wire accommodation holes 32, said holes being just large enough for individual service wires with sufficient porcelain partitions in between to prevent cracking under tension.

The comparison between a hook-up made with services attached to the present type insulators, and one where the individual services are attached through the single or additional holes in the insulator, which is a feature of this invention, will readily convince electricians and members of the trade of the great usefulness and economy of this new insulator.

Changes in shape, size, materials and rearrangement of details and parts may be resorted to in actual practice, so long as they do not depart from the spirit of the invention or the scope of the appended claims, as is well understood.

Having thus described the invention, what is claimed as new is:

1. A secondary service rack insulator of the class shown and described comprising a one-piece body of insulation material including a circular base and an integral knob atop said base, said knob being eccentric to the central vertical axis of the base, of spool-like design and including a head and a groove said base and knob having a vertical bore passing therethrough, the bore being axial in relation to the center of the knob and eccentric in relation to the base and serving to permit the insulator to be mounted on a secondary rack rod in a manner to offset a major portion of the base in respect to the knob, the offset portion of the base having aperture means to accommodate a plurality of individually attachable service wires.

2. A secondary service rack insulator of the class shown and described comprising a one-piece body of insulation material including a circular marginally grooved base and an integral knob atop said base, said knob being situated eccentrically to the central vertical axis of the said base, spool-like in design and including a head and a groove, said base and knob having a vertical bore passing therethrough, said bore being axially disposed in relation to the center of the knob and eccentric in relation to the base and serving to permit the body, as a unit, to be mounted on a secondary rack rod in a manner to offset a major portion of the base in respect to said knob, the offset portion of the base having aperture means therein to accommodate a plurality of individually attachable service wires and said aperture means being an uninterrupted elongated fragmental slot, and a reinforcing band lodged in the marginal groove and serving to strengthen said base.

3. A secondary service rack insulator of the class shown and described comprising a one-piece body of insulation material including a circular base and an integral knob atop said base, said knob being eccentric to the central vertical axis of the base, of spool-like design and including a head and a groove, said base and knob having a vertical bore passing therethrough, the bore being axial in relation to the center of the knob and eccentric in relation to the base and serving to permit the insulator to be mounted on a secondary rack rod in a manner to offset a major portion of the base in respect to the knob, the offset portion of the base having a plurality of individual circumferentially spaced holes of sizes sufficient to accommodate and successively anchor individual service wires.

RAYMOND A. LOUX.

REFERENCES CITED

The following references are of record in the file of this patent:

UNITED STATES PATENTS

| Number | Name | Date |
| --- | --- | --- |
| 964,737 | Ashley | July 19, 1910 |
| 1,084,147 | Hopkins | Jan. 13, 1914 |
| 1,213,211 | Klauber et al. | Jan. 23, 1917 |
| 2,296,679 | Mack | Sept. 22, 1942 |
| 2,305,069 | Emge | Dec. 15, 1942 |
| 2,305,541 | Lueke | Dec. 15, 1942 |

OTHER REFERENCES

Line Material Co., Sectional Catalog #24, page 922. (Copy in Div. 65.)